Dec. 20, 1927.
I. W. LITCHFIELD
1,653,052
STAPLING MECHANISM
Filed Aug. 21, 1926
6 Sheets-Sheet 2
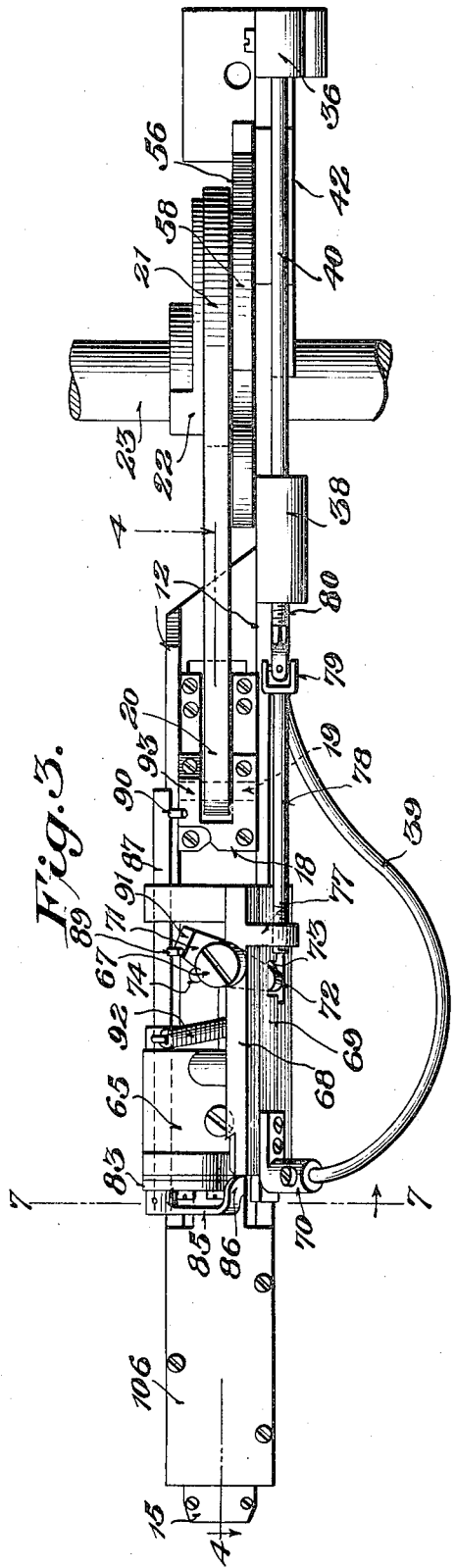
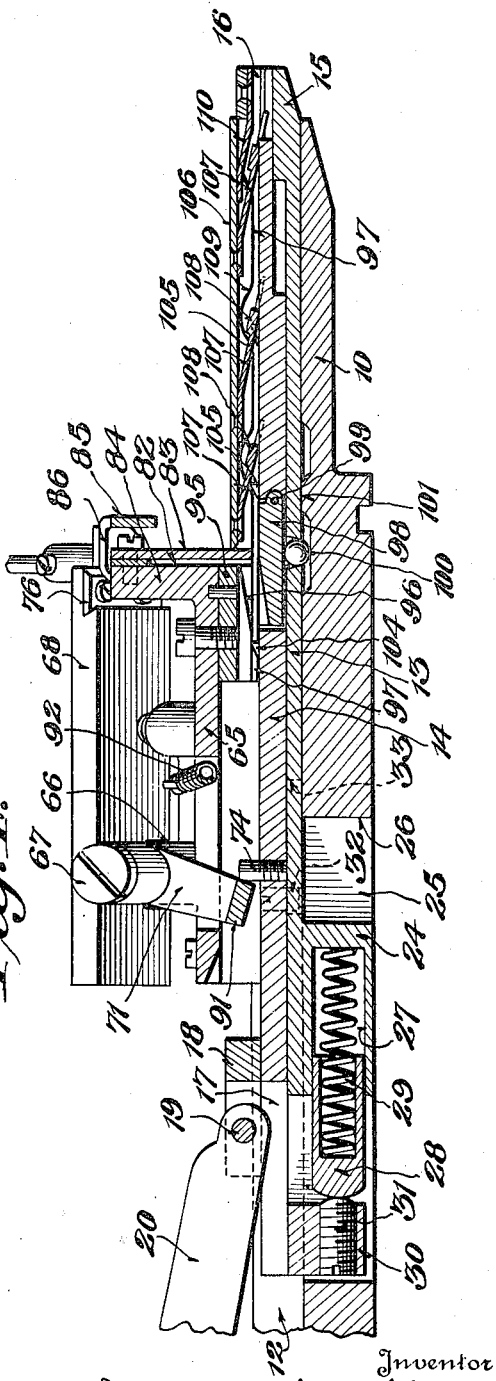

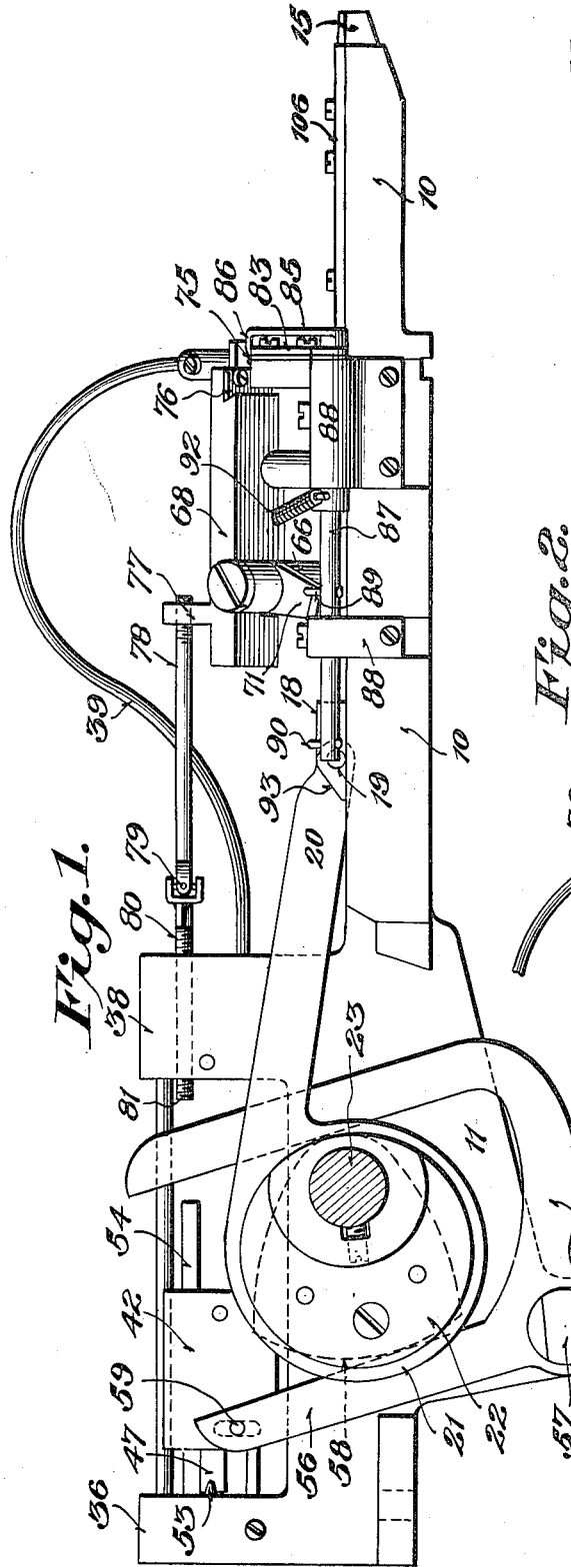

Dec. 20, 1927.
I. W. LITCHFIELD
1,653,052
STAPLING MECHANISM
Filed Aug. 21, 1926
6 Sheets-Sheet 3
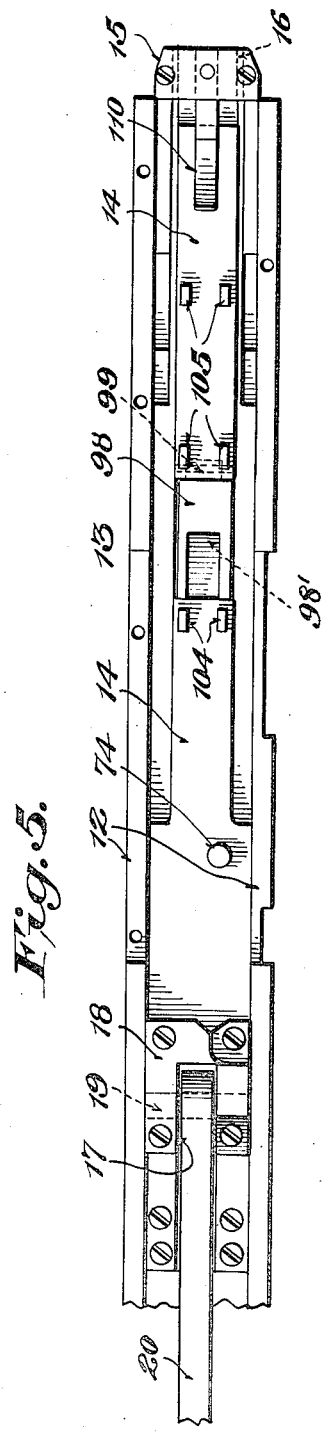
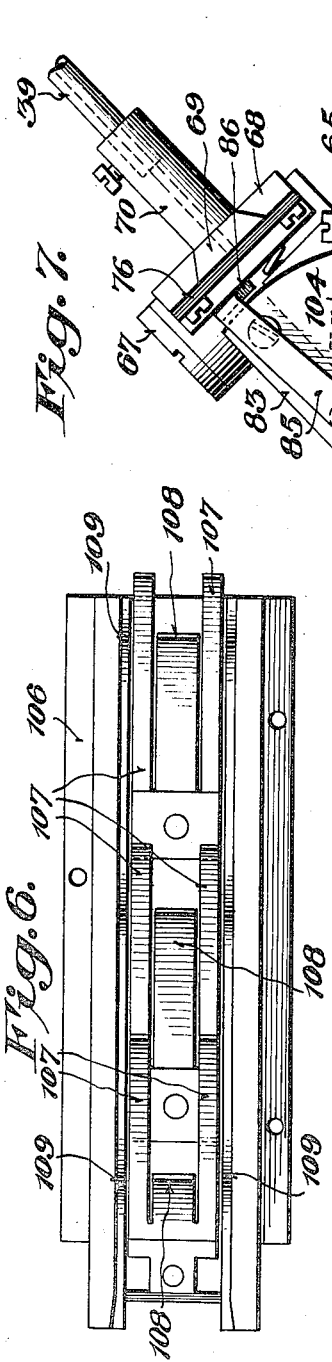
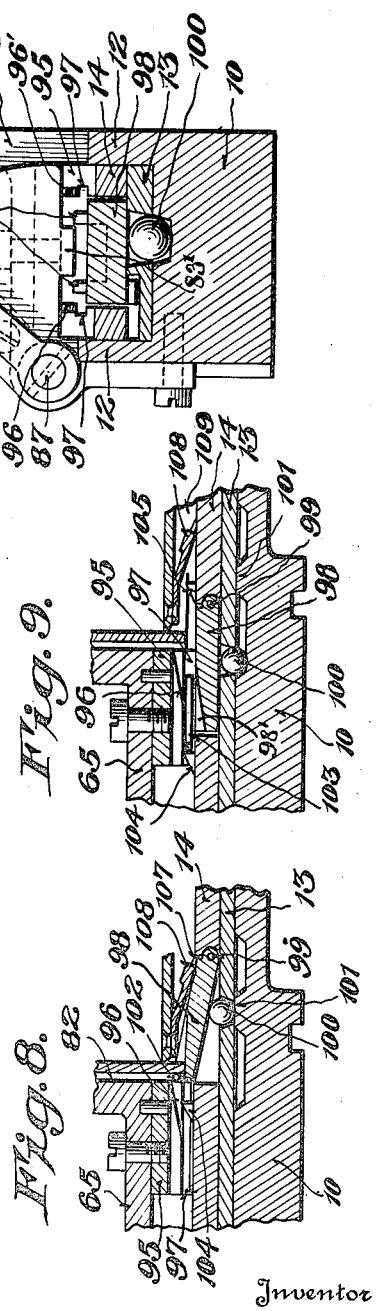
Inventor
Isaac W. Litchfield
By Mauro, Cameron, Lewis & Massey
Attorney Dec. 20, 1927. 1,653,052
I. W. LITCHFIELD
STAPLING MECHANISM
Filed Aug. 21, 1926 6 Sheets-Sheet 4

Inventor
Isaac W. Litchfield
By Mauro, Cameron, Lewis & Massey
Attorney

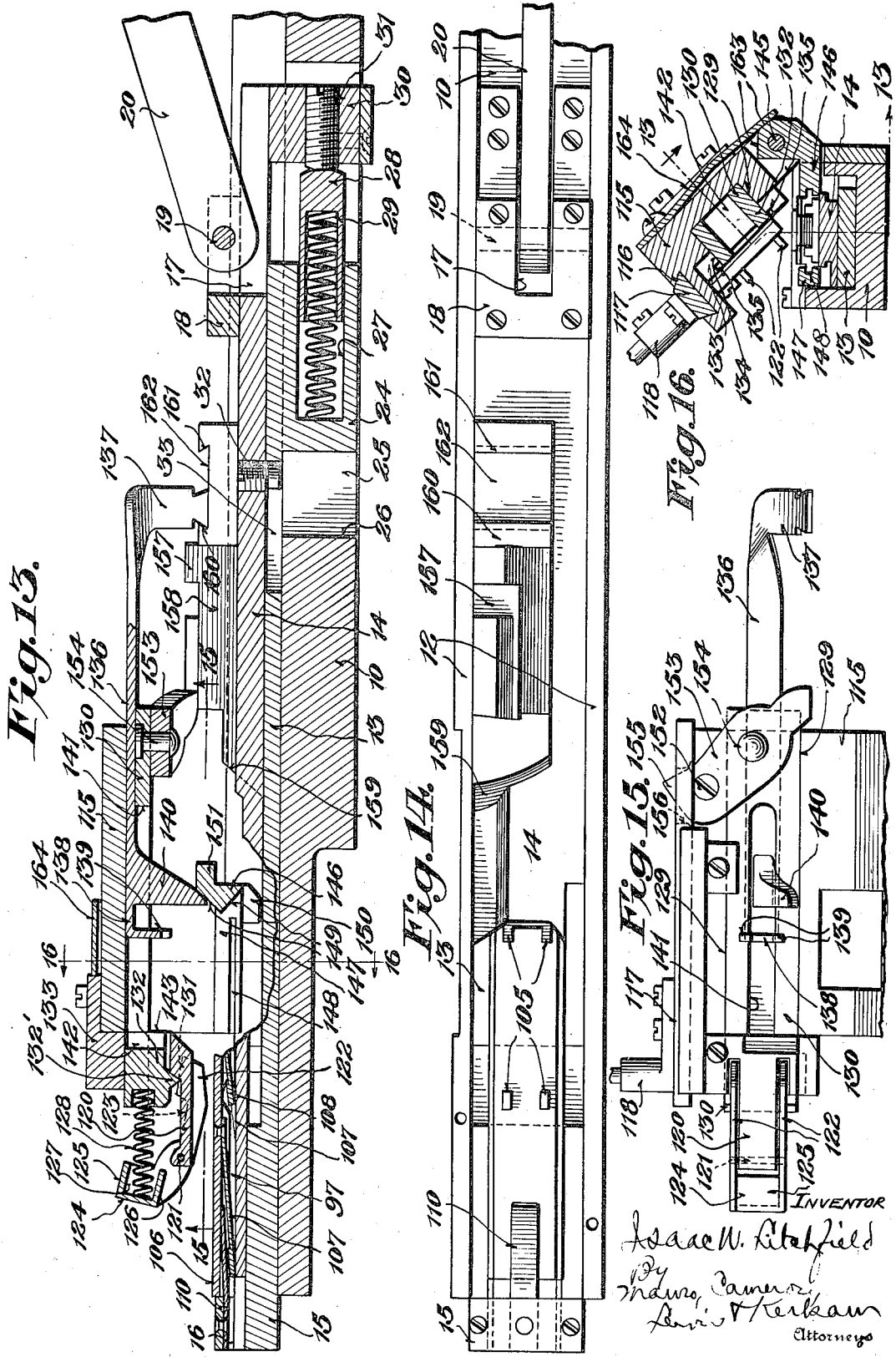

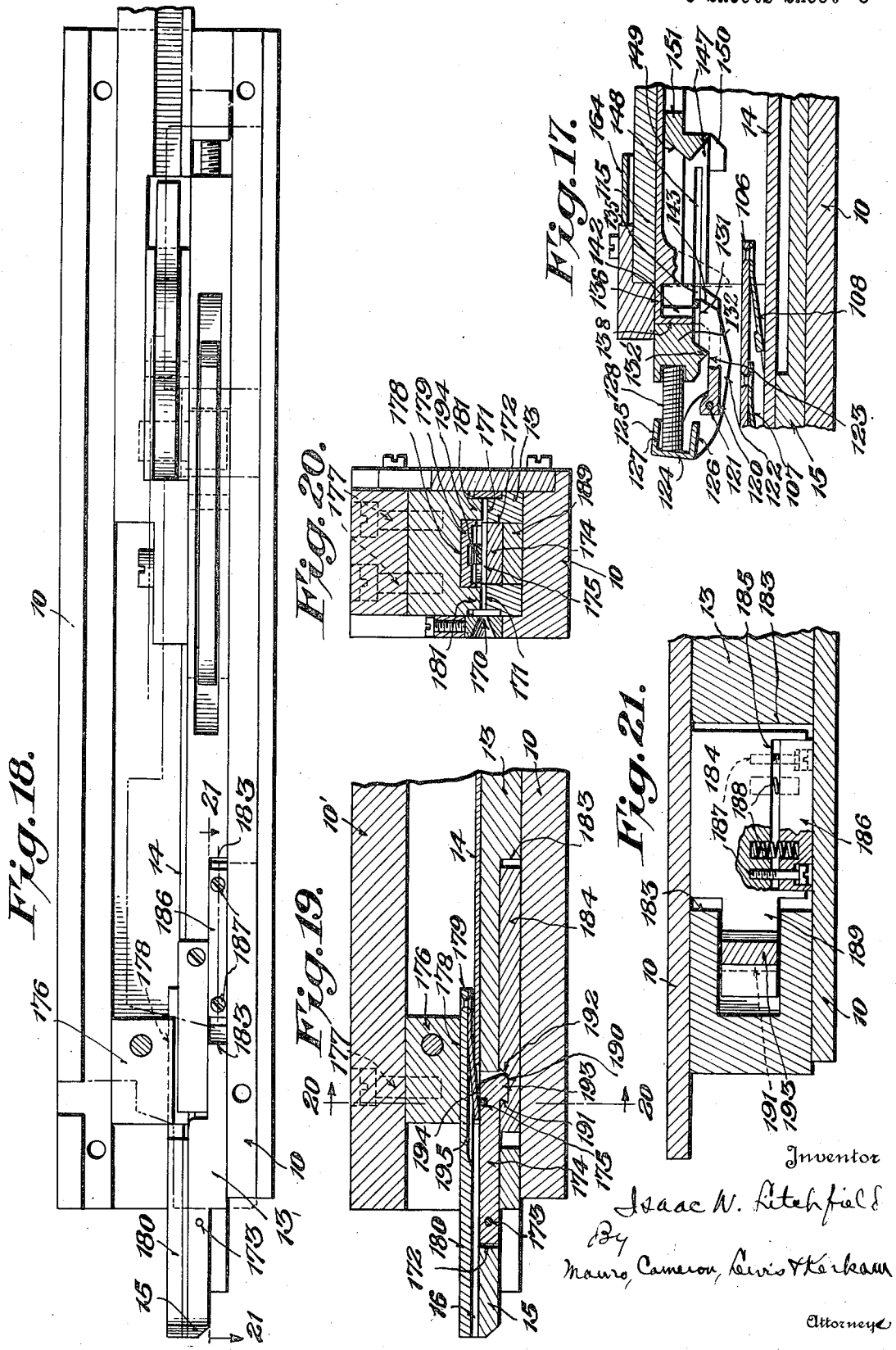

Patented Dec. 20, 1927.

1,653,052

UNITED STATES PATENT OFFICE.

ISAAC W. LITCHFIELD, OF BOSTON, MASSACHUSETTS, ASSIGNOR TO BEMIS BRO. BAG COMPANY, OF NEW YORK, N. Y., A CORPORATION OF MISSOURI.

STAPLING MECHANISM.

Application filed August 21, 1926. Serial No. 130,643.

This invention relates to mechanism for automatically forming and inserting staples, and has for an object the provision of stapling mechanism that is available for use wherever it is desired to form staples of any suitable wire and insert them into any suitable material, as in the closing of flexible containers, assembling of pamphlets, magazines, etc., manufacture of bags, boxes and other articles of flexible or fibrous material, etc.

Another object of the present invention is the provision of stapling mechanism that may be operated at high speed, so that it is not only capable of a high output per unit of time, but also available for service in cooperation with other high speed machines, and also capable of making and inserting staples during relatively brief periods when the products to be acted on are in proper position or condition for the insertion of staples during the cycles of other machines.

Another object of the invention is to provide stapling mechanism which, in closing flexible containers, may operate closely to the contents of the container and thereby conserve the material of the container.

Another object of the invention is to provide stapling mechanism wherein the staple is formed by a member having a relatively short stroke, so that the minimum of time is consumed in the formation of the staple.

Another object of the invention is to provide stapling mechanism wherein the staple is formed during a short back stroke of relatively movable forming dies and on the forward stroke advanced with its legs projecting forwardly for insertion into the material to be acted upon.

Another object of the invention is to provide stapling mechanism wherein the staple is positively moved and positively controlled at all stages of its production and advancement, and wherein the staple is so formed and fed as to insure against its becoming jammed or deformed during the formation of the staple or during its subsequent feeding movements.

Another object of the invention is to provide improved staple-forming and feeding devices whereby the staples may be formed in one plane and advanced in another plane at high speed with a minimum number of simple, rugged parts.

Another object of the invention is to provide feeding mechanism for the staples so that the staples are progressively advanced in a step by step movement by the relatively short stroke of staple feeding devices.

Another object of the invention is to provide staple-forming mechanism with improved wire feeding devices so that the wire shall be positively fed by predetermined amounts, which are preferably adjustable, and wherein fresh lengths of wire may be gripped for advancement without danger of retraction of the wire and without undue wear on the feeding mechanism.

Another object of the invention is to provide stapling mechanism which is relatively simple and compact in structure and so driven that a gang of stapling mechanisms may be assembled in closer relationship than heretofore obtainable, so that staples may be inserted simultaneously and more closely together than was heretofore possible.

Another object of the invention is to provide stapling mechanism which is so simple and compact that it may be readily operated by unskilled labor and readily transported from place to place, and at the same time one that is strong and rugged so that it is capable of withstanding the shocks and wear of normal service.

Other objects will appear as the description of the invention proceeds.

Three embodiments of the present invention are shown on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures:—

Fig. 1 is a side elevation of an embodiment of the present invention.

Fig. 2 is an elevational view of the opposite side of the embodiment of Fig. 1.

Fig. 3 is a plan view of the embodiment of Fig. 1.

Fig. 4 is a longitudinal section on the line 4—4 of Fig. 3.

Fig. 5 is a plan view of the compound reciprocating member by which the staples are formed and fed forwardly.

Fig. 6 is an inverted plan view of the cover plate for the feeding mechanism.

Fig. 7 is a section on the line 7—7 of Fig. 3.

Fig. 8 is a fragmentary section showing the die members just before the staple is formed.

Fig. 9 is a fragmentary view of the die members just after the staple is formed.

Fig. 13 is an enlarged longitudinal section, on the line 13—13 of Fig. 16, showing the staple-forming and feeding mechanisms.

Fig. 14 is a plan view of the compound reciprocating member of the embodiment of Fig. 10.

Fig. 15 is fragmentary section on the line 15—15 of Fig. 13, looking toward the upper wall of the housing.

Fig. 16 is a transverse section on the line 16—16 of Fig. 13.

Fig. 17 is a fragmentary view to illustrate the relation of the parts just before the staple is formed.

Fig. 18 is a fragmentary elevation of another embodiment of the present invention, with a lateral wall removed.

Fig. 19 is a fragmentary axial section of the embodiment of Fig. 18.

Fig. 20 is a transverse section on the line 20—20 of Fig. 19.

Fig. 21 is a fragmentary horizontal section on the line 21—21 of Fig. 18.

Figure 10:
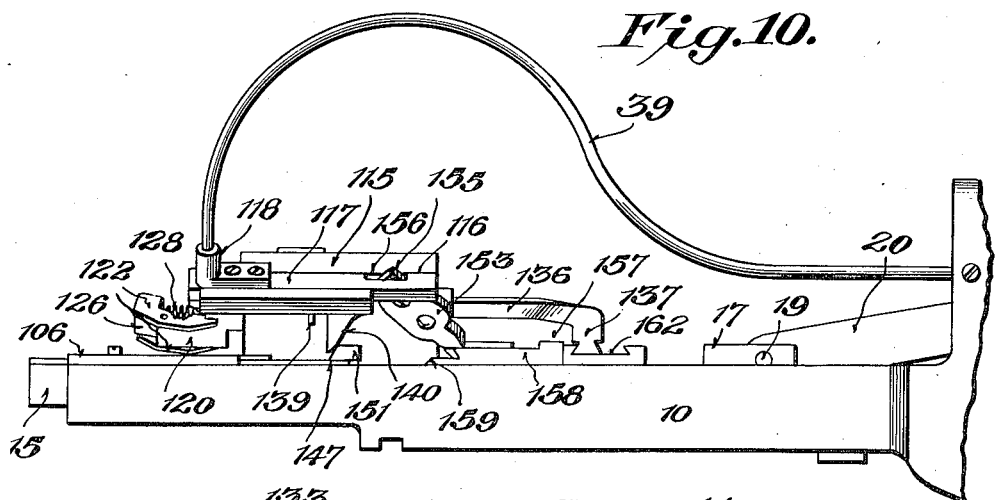
Fig. 10 is a side elevation on a smaller scale of another embodiment of the present invention.

Referring first to the embodiment of Figs. 1 to 9 inclusive, the stapling mechanism is shown as mounted on a longitudinal frame 10 of any suitable size, construction and material, said frame having a depending skirt 11 at one side to afford bearings for parts to be described. The forward portion of said frame is formed as a channel 12 (Figs. 3 and 5), and reciprocatably mounted within the way thus provided by said channel is a compound reciprocating member composed of a main reciprocating member 13 (Fig. 4) which occupies the full width of the way defined by the channel 12 and a driving member 14 which is narrower than member 13 and reciprocates in a channel-shaped way provided in the main reciprocating member 13. The main reciprocating member 13 is provided with a nose 15 which is designed to be advanced and pressed resiliently against the material into which the staple is to be inserted, said nose containing a slot 16 of the width of the formed staple and through which the staple is driven into said material by the driving member 14.

Said compound reciprocating member may be reciprocated in any suitable way. In the form shown the driving member 14 is provided with a slot 17 and an upstanding projection 18 in which is pivoted at 19 a rod 20 which is reciprocated by any suitable device, as by a cam or eccentric. In the form shown said rod 20 is connected to an eccentric strap 21 (Fig. 1) which surrounds an eccentric 22 in the plane of said rod 20, said eccentric being mounted on a drive shaft 23 which has bearings in the frame 10 and extends at right angles to the width of said frame.

Said members 13 and 14 normally move as a unit through a portion of their stroke, but are designed to have movement relative to each other during other portions of their stroke, and to this end reciprocating member 13 is provided with a depending block 24 (Fig. 4) which may reciprocate within a slot 25 formed in the frame 10 and which is limited in its forward movement by said block 24 engaging the end wall 26 of said slot if the nose of member 13 has not previously engaged the material into which the staple is to be inserted. Block 24 is recessed as shown at 27 and reciprocatably mounted within said recess is a recessed plunger 28 between which and the bottom of the recess 27 extends a coil spring 29 whereby said plunger is normally pressed outwardly. The driving member 14 is also provided with a depending block or post 30 which carries an adjustable contact screw 31 in a position to be engaged by the plunger 28, said block 30 also reciprocating in the slot 25. Driving member 14 is also provided with a pin 32 which works in a slot 33 in the reciprocating member 13. Movement of the rod 20 toward the right, as viewed in Fig. 4, causes the compound reciprocating member 13, 14 to move as a unit toward the right until the nose 15 engages the material into which the staple is to be inserted, or until the block 24 engages the end wall 26 of the slot 25. Further movement of rod 20 toward the right causes the driving member 14 to move toward the right relatively to the member 13, the spring 29 being compressed by the action of block 30 on plunger 28. Thereby, if the nose 15 is in contact with the material into which the staple is to be inserted, said nose is pressed resiliently against said material during the period when the driving member 14 is moved relatively to the member 13—during which period the staple is inserted through the slot 16 as hereinafter explained.

The wire forming the staple, which may be of any suitable shape, size and material, is fed to the staple-forming device through an aperture 35 (Fig. 2) in an upstanding post 36 on the frame 10, and thence through a corresponding aperture 37 in an upstanding post 38 on said frame, to and through a tubular guide 39 which is preferably made of resilient material for a purpose to be explained.

Any suitable means may be employed for feeding the wire through said apertures and guide. In the form shown (see Fig. 2) posts 36 and 38 are connected by a pair of rods 40 and 41, and mounted to slide on said rods is a carriage 42 of generally channel-shaped formation. The laterally projecting ledge 44 on said carriage has on its inner surface a groove 45 to receive the wire, and pivoted at 46 in the bottom of said channel-shaped carriage is a wire clamping member 47 provided with a clamping jaw 48 and normally urged into clamping position by a spring 49 between the ledge 44 and said member 47. Said clamping member 47 has a rearwardly extending arm which is notched on its upper surface as shown at 50, the rear wall of said notch being rearwardly inclined as shown at 51. The rear end of said clamping member also has a notch 52 for coaction with the projection 53 on the post 36. Mounted between the clamping member 47 and the upper laterally projecting ledge of the carriage 42 is a bar 54 which may slide with respect to both the clamping member and the carriage and which has a depending lug 55, designed to enter and coact with the slot 50. The rear end of this lug 55 is inclined in conformity with the rear wall 51 of the slot 50.

Carriage 42 may be reciprocated on its rods 40, 41 in any suitable way. In the form shown a cam yoke 56 is pivoted at 57 on the depending skirt 11 and cooperates with a cam 58 mounted on the shaft 23 contiguous to eccentric 22. Said yoke 56 is suitably connected to the carriage 42, as by a pin and slot connection 59.

As the carriage 42 is moved to the left from the position shown in Fig. 2, the wire is clamped between the jaw 48 and the lower ledge 44 of the carriage 42, as soon as notch 52 leaves projection 53, and the wire is carried therewith toward the left as viewed in said figure until the projecting end of the bar 54 engages the post 38 or an adjustable projection thereon (as hereinafter described), whereupon said bar 54 is held stationary while carriage 42 continues its movement toward the left, the arm of the clamping member 47 being cammed downwardly as viewed in Fig. 2 by the coaction of the inclined surfaces of the lug 55 and slot 50, whereby the clamping jaw 48 is released from the wire in the groove 45. The carriage 42 continues its movement toward the left, the jaw 48 moving freely over the wire to the end of the stroke and the lug 55 riding on the upper surface of the clamping member 47. As the carriage moves on its reverse stroke, to the right as viewed in Fig. 2, the bar 54 is moved frictionally therewith until it engages the post 36, the lug 55 still holding the clamping jaw open during this movement of the carriage. When the member 54 engages the post 36, its rearward motion ceases, while the carriage continues to move rearwardly, permitting the lug 55 to drop into the slot 50. In order to prevent the clamping jaw 48 from closing until the carriage has actually started on its forward stroke, the notch 52 is now engaged with the projection 53, so that the jaw is held open notwithstanding that the lug 55 has dropped into the slot 50. The clamping jaw is therefore held open until the carriage moves the clamping member 47 to disengage its notch 52 from the projection 53. As soon as this disengagement occurs, the spring 49 closes the jaw and further movement of the carriage toward the left, in Fig. 2, is accompanied by a feeding movement of the wire.

In order to positively prevent the wire from being displaced during the non-feeding movement of the carriage 42, a spring-pressed clamping member 60 may be pivoted at 61 in a recess 62 in the post 38, said member being acted upon by spring 63 which causes said member 60 to resiliently clamp the wire in any position in which it may be left but without interfering with the positive feeding of the wire as heretofore described.

While a preferred device for feeding the wire has been illustrated and described in detail, it is to be expressly understood that the invention in its broader aspect is not restricted to the feeding mechanism disclosed as a variety of such feeding mechanisms may be employed. The device for predetermining the length of the feed relatively to the stroke of the carriage may also be varied. Thus the clamping jaw may be held out of clamping position for a predetermined portion of its stroke by a fixed projection on one of the posts engaging the clamping member 47 to hold the jaw open for the determined portion of the stroke, or the clamping member may coact with a tubular member slidable on one of the rods 40 or 41, said tubular member moving with the carriage until it engages suitable abutments and the clamping member being held open by running onto said member when the latter is stopped at one end of its stroke and being permitted to close by running off of said member when the latter is stopped at the opposite end of its stroke. These and other possible changes in the feeding mechanism will now be apparent to one skilled in the art.

In conformity with the present invention the staple is preferably formed in one plane during a short back stroke of the driving member 14 and fed forward with its legs advanced during a correspondingly short stroke of the driving member 14 in the opposite direction, and by preference the staple is formed on the back stroke in one plane and fed forward on the forward stroke in a different plane. It has heretofore been proposed to form the staple on a back stroke and feed it forward with its legs advanced on the forward stroke, but so far as I am aware all proposals of this character have been ineffective because they have failed to take into consideration the tendency of the staple to spread by reason of the resiliency of the wire, whereby the staple has failed to move in the desired path and became jammed and deformed. To avoid the difficulties heretofore experienced the present invention includes means whereby the staple is positively controlled at every stage of its formation and feeding.

In the embodiment of the invention shown in Figs. 1 to 9 inclusive the wire is fed to the staple-forming devices in a plane at substantially 45° to the plane of said devices. The wire is then cut off and laid down into the plane of the staple-forming devices. The staple is formed in one plane during a short back stroke and is then fed forwardly in a closely adjacent parallel plane, with its legs advanced. To this end, the intermediate portion of the frame is provided with a housing 65 suitably secured to the channel-shaped way 12. Extending upwardly from said housing at an angle of approximately 45° is a lug 66, and pivotally mounted on said lug at 67 is a stationary cutter plate 68 which lies in a plane at approximately 45° to the frame. Said plate 68 is provided with a longitudinally extending channel and reciprocatably mounted in said channel is a movable cutter bar 69 which carries a tubular bracket 70 into which the end of the tubular guide 39 is extended and suitably secured. Cutter bar 69 is designed to be reciprocated by a lever 71 which is fulcrumed on said lug 66 and has its upwardly positioned end 72 engaged in a slot 73 in said movable cutter bar.

The opposite end of said lever 71 projects downwardly into the path of the projection 18 to which the eccentric rod 20 is pivoted, so that when said projection 18 engages said lever 71, as viewed in Fig. 4, said lever is rotated in an anti-clockwise direction to cause the movable cutter bar 69 to move toward the right, as viewed in Fig. 2. Driving member 14 is also provided with an upstanding pin 74 which may engage said lever 71 on the back stroke and return the movable cutter bar to initial position, but by preference the cutter bar is restored to initial position by the force of resiliency and, to this end, the tubular guide 39, as heretofore described, is preferably made of resilient material so that it restores the cutter bar to its leftward position, as viewed in Fig. 2, as soon as the lever 71 is released by the retraction of the projection 18. The wire which enters through the tubular bracket 70 passes through an aperture 75 in the bar 69 (Fig. 1) and is cut off by the movement of said bar and wire relatively to the stationary edge of a knife 76 suitably secured to the underside of the stationary cutter bar 68.

In order to adjust the length of the wire that is cut, to provide for staples of different sizes, the stationary cutter bar 68 is pivoted on the lug 66 as heretofore described, and carries an upstanding post 77 in which is threaded, by a left-hand thread, a rod 78 which is connected through a universal joint 79 with a rod 80 that threads in a right-hand threaded aperture in the post 38 or said post 77 may be positioned on the opposite side of pivot 67 and the rod 78 may be rotatably but non-detachably mounted in said post. Rod 80 projects rearwardly beyond said post, as shown at 81, to form an adjustable stop for the bar 54 heretofore described. By rotating the screw 80 the extent of projection of 81 may be varied, and therefore the forward feed of the wire be increased or decreased by lengthening or shortening the stroke of said bar 54. This movement of adjustment of the screw 80 simultaneously pivots the cutter mechanism heretofore described about its pivot 67. The amount to which the cutting mechanism is advanced or withdrawn, owing to the relation of the post 77 to the fulcrum 67, is one-half the extent to which the feed of the wire is adjusted, so that the severed section of wire shall be centered with respect to the staple-forming mechanism next to be described.

The wire as it is fed forwardly through the aperture 75 is received in a slot 82 (Fig. 4) which may be conveniently formed between a plate 83 and the forward face of an upstanding projection 84 on the housing 65. This slot is of a width to receive the wire without binding, and when the staple is to be made from a flattened wire, said slot is of a width to receive the wire flatwise and prevent its turning in said slot. The lower edge of plate 83 also has a projection 83' which remains in contact with the wire after it is laid in its lower position and prevents the wire from turning in this latter position. The wire as it enters the slot is at an angle of approximately 45° to the frame, and when it is severed, the severed section is laid down into a plane parallel to the compound driving member 13, 14 heretofore described, the slot 82 being suitably shaped to permit this movement of the severed section of the wire.

To lay the wire in its lower position, an arm 85, provided with an inwardly projecting end 86 which overlies the slot 82, is carried by a rotatable rod 87 mounted in suitable bearings 88 on the housing. Rod 87 also carries a pair of pins 89 and 90. Pin 89 cooperates with a lateral projection 91 on the end of the lever 71, said projection 91 engaging said pin 89 in one position to hold the rod 87 so that the arm 85 is disposed with its end above the wire that has been projected through the aperture 75, but said projection releasing said pin 89 when said lever 71 is actuated to operate the cutting mechanism. Rod 87 is normally urged to rotate in a direction to throw the arm 85 downwardly, and to this end a coil spring 92 is suitably attached at one end to a pin carried by a collar fixed on said rod, and at its opposite end to the stationary cutter bar 68. When projection 91 releases the pin 89, therefore, the end 86 of arm 85 engages the wire with a tendency to move downwardly but it is held against this movement by engagement with the wire. As soon as the wire is severed, however, arm 85 is rotated by the spring 92 so that the severed section of wire is forced down ahead of the laterally projecting end 86 until the wire is in its lower position for coaction with the forming dies.

Pin 90 cooperates with an inclined surface 93 on the projection 18 of the driving member 14, so that when said inclined surface 93 engages said pin 90 on the back stroke of driving member 14, the rod 87 is rotated to raise arm 85 above the path of the entering wire and to restore pin 89 into cooperative relation with the projection 91 on the end of lever 71.

The severed piece of wire is laid by the arm 85 across the entrance to a matrix die member 95, shown as an inverted channel-shaped member suitably secured to the underside of the housing 65. The lateral walls of said die member are each provided with a downwardly and rearwardly inclined surface 96 which leads to a horizontal slot 97, the width of the channel between the bottoms of the slots 97 being slightly greater than the width of the channel at the inclined surfaces 96. The male die member, in this embodiment of the invention, takes the form of a block 98 pivoted at 99 in a cutaway portion of the driving member 14, and adapted to be cammed upwardly (Fig. 8) by a ball 100 carried in an aperture in the main reciprocating member 13 and cooperating with a cam surface 101 provided in the bottom of the way for said reciprocating member 13. The upper face of the die block is grooved at 98′ to receive the projection 83′ when the die block is cammed upwardly.

As the reciprocating members 13 and 14 are reciprocated rearwardly from their forward position, at which time the wire section has been laid across the opening of the matrix die member 95 as shown at 102 in Fig. 8, die member 98, owing to the cooperation of ball 100 with cam surface 101, is inclined upwardly so as to engage the wire as it lies across the opening of said matrix die member, and as said die member 98 continues its rearward movement, the wire section is drawn into the matrix die 95 to form the staple. At this time there is no obstruction to the path of the ends of the wire to prevent the wire from being immediately formed into the rectangular form of a staple. As the wire section is drawn into the matrix wire member 95 it is also positively moved downwardly by the action of the inclined surfaces 96, and when the formed staple reaches the bottom of these surfaces, the male die member 98 continues to move the staple positively and rearwardly into the grooves 97, as shown at 103 in Fig. 9, whereupon the legs of the staple spring outwardly into said grooves owing to their natural resiliency, and the staple is prevented from rising along the inclined surfaces 96 during the subsequent forward stroke of the drive member because of the greater width of the channel in the plane of said grooves 97. Throughout this rearward movement of the staple it is positively controlled and moved by the male die member 98 and, if desired, the cam surface 101 may be so shaped as to positively hold the male die member up in engagement with the staple throughout this period—although this is unnecessary as the friction between the male die member and the staple will prevent the male die member from dropping until the staple has sprung into the grooves 97.

The upper surface of drive member 14 is provided with a pair of upstanding lugs or pins 104 which are always rearward of the forming staple as shown in Figs. 8 and 9. When the drive member 14 is moved toward the right as shown in Fig. 4, however, said lugs or pins 104 engage the staple and feed it forwardly within the grooves 97 with the legs of the staple projecting forwardly. Suitable means may be provided for preventing the rise of the male die 98 during this direction of movement of the member 14, but there is no objection to its again rising, as it may rise freely within the space embraced by the legs of the staple without interfering with the latter as it is fed positively forward in the grooves 97.

In order that the staple-forming mechanism may work at high speed the strokes of the parts heretofore described, as will be apparent, are relatively short, while it may not be convenient, in view of the mechanism with which the staple-forming and inserting devices may be associated, to bring the housing 65 closely adjacent the plane of the material into which the staple is to be inserted. Therefore means are preferably provided whereby the formed staples are successively advanced in a step by step motion to the point at which the forward staple is to be inserted. Any desired number of stages of advance may be employed according to the length of space desired between the front of the housing 65 and the end of the nose 15. In the structure illustrated three stages of advance before insertion are illustrated, although it is to be expressly understood that a larger or smaller number of stages may be employed. To provide this step by step advance of the staples, the reciprocating member 14 is provided with a plurality of successive pairs of upstanding lugs or pins 105, disposed at distances along its length equivalent to the stroke of said member, and the forward end of the channel for the compound reciprocating member is closed by a cover plate 106 (Figs. 4 and 6) which carries on its underside a corresponding number of downwardly inclined U-shaped springs 107 which are designed to bear upon the staples as they are fed forwardly in the grooves 97. Each U-shaped spring 107 also has an intermediate arm 108 which projects below the plane of the lateral arms and forms a positive stop for engaging the rear of the staple and preventing its retraction during the rearward movement of the member 14. The grooves 97 are provided with a series of enlargements 109 (Fig. 4) adjacent said arms 108 so as to permit the body of each staple to rise over the lugs or pins 105, being cammed up by the inclined rear faces of said lugs as said lugs approach the end of their rearward movement. During the time that the staples are thus cammed upwardly against the tension of the springs 107, rearward movement of the staples is positively prevented by the arms 108. The staples are accordingly fed forward in a step by step motion and are continuously controlled by the springs 107 which hold them in the grooves 97 and prevent their dislocation in or from the groove.

The last resilient member 107 is designed to depress the foremost staple downwardly into the path of the driving member 14 when the latter is in its rearward position, as viewed in Fig. 4, and the nose 15 is provided with an additional spring 110 which is secured at one end in the slot 16 and has an intermediate bent section to aid in depressing the foremost staple, the rear end of said spring bearing freely against the cover plate as shown. After the foremost staple is depressed into the slot 16 in the path of the driving member 14 it is forced through said slot by said driving member and into the material into which the staple is to be inserted.

To recapitulate briefly the operation of the stapling mechanism, the rotation of the shaft 23 causes the eccentric 22 to reciprocate the rod 20 and therefore the compound reciprocating member 13, 14, said members moving as a unit during their initial advance. At the same time cam 58 causes the movement of the yoke 56, and the carriage 42 is advanced to feed the wire forwardly in the manner heretofore described, the clamping jaw 48 being in clamping position as soon as the notch 52 is free from the projection 53. The wire is thus positively fed through the tubular guide 39, the tubular bracket 70 and the aperture 75, the extent of feed being determined by the relative projection of the end 81 of screw 80 which determines the instant when bar 54 shall cease its forward stroke and cam the clamping member 47 open by the coaction of its lug 55 with the rear face 51 of the slot 50. At this stage of the operation the arm 85 is held in its upper position by the coaction of pin 89 with the lateral projection 91 on the lever 71.

The forward movement of the rod 20 is accompanied by a forward movement of reciprocating members 13 and 14, which move as a unit until the nose 15 engages the material into which the staple is to be inserted. Member 13 then ceases to advance, and member 14 continues to advance against the tension of spring 29. Projection 18 on said member 14 then engages the lower end of lever 71 and said lever is moved in an anti-clockwise direction as viewed in Fig. 4. During this movement of lever 71 its projection 91 moves out of engagement with pin 89 and spring 92 moves the end 86 of arm 85 against the projected wire. Further movement of lever 71 causes the movable cutter bar to be reciprocated toward the right, as viewed in Fig. 2, whereupon the wire is severed at the edge of cutter plate 76, and spring 92 immediately causes arm 85 to lay the severed section of wire across the mouth of the matrix die 95.

As the reciprocating members 13, 14 move rearwardly or toward the left as viewed in Fig. 4, the male die member 98 is cammed upwardly by the ball 100 coacting with the surface 101, and the severed section of wire is formed into a staple by the relative movement of the male die and the matrix die, the formed staple being simultaneously forced down the inclined surfaces 96 and out into the grooves 97, where the legs of the staple spring outwardly into said grooves. The male die member now drops to its lower position. During this rearward movement of the members 13, 14 the movable cutter bar 69 is returned to initial position under the resiliency of the tubular guide 39 or by the engagement of pin 74 with the lever 71, and the incline 93 coacts with pin 90 to rotate the rod 87 against the tension of spring 92 to elevate the arm 85, ready for a fresh advancement of the wire. During this rearward movement of the members 13, 14 the carriage 42 is also moved rearwardly into a position for the jaw 48 to take fresh grip upon the wire in the manner heretofore described.

The next time the machine is operated the same cycle of operation is repeated, and the staple which has been formed during the previous cycle is fed forwardly in the grooves 97 by the lugs 104 until the staple passes the first depending arm 108, where it is retained during the return movement of member 14. During successive cycles of operation successive staples are formed and fed forwardly until the forward staple is forced downwardly ahead of and into the path of the reciprocating member 14, and on the next forward movement of that member a staple is forced into the material through the nose 15. Thereafter at every operation of the stapling mechanism a staple is forced into the material while other staples are being formed and fed forwardly in the manner described.

It is to be noted that the stapling mechanism is therefore driven from a shaft at right angles to the length of the stapling device, and as all of the driving mechanism, including the eccentric and strap and the cam and yoke, are confined within the width of the channel-shaped frame which constitutes the way for the reciprocating members, the entire mechanism including the wire feeding devices, the staple-forming devices and the staple feeding devices are embraced in a width which is but little greater than the width of the formed staple, the width of the frame being approximately the same as the length of the wire from which the staple is formed. Therefore a gang of stapling mechanism may be arranged very closely together, in side by side contact if desired. The only element projecting laterally from the narrow width of the frame is the tubular guide 39, and as this guide is in a plane of approximately 45° to the plane of the frame, it does not interfere with the adjacent stapling mechanism arranged in lateral contact with the first stapling mechanism.

It is also to be noted that all of the movable parts have relatively short strokes and therefore staples may be formed and fed at a relatively high rate of speed. It is also to be noted that the staple is made on a short back stroke, with its legs projecting forwardly, the staple being formed in one plane, and then moved positively into a closely adjacent parallel plane, in which it is fed forwardly, in a step by step motion, during a relatively short forward stroke. Hence the time consumed in performing each of the operations is relatively short, while the functions are performed by a comparatively small number of movable parts which have simple and brief movements so that they may operate at high speed. Accordingly the mechanism is simple and rugged, may be readily transported and easily operated, and is so compact as to facilitate its use in gangs, while at the same time it may be run at high speed and form and insert staples as fast as may be required.

Figure 11:
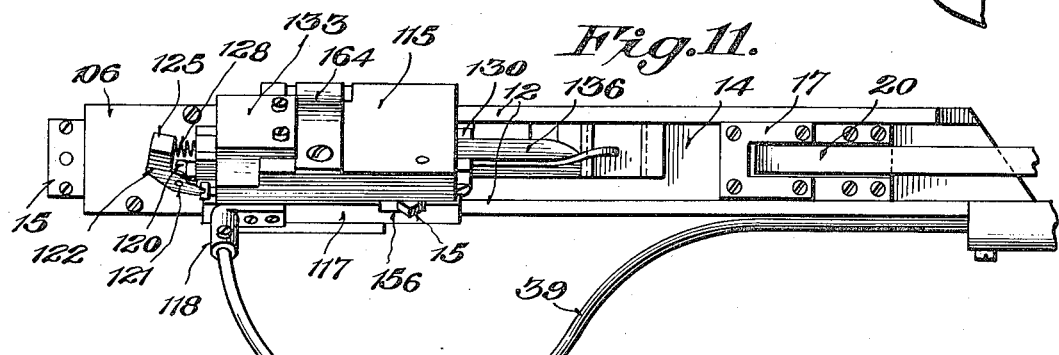
Fig. 11 is a plan view of the embodiment of Fig. 10.
Figure 12:
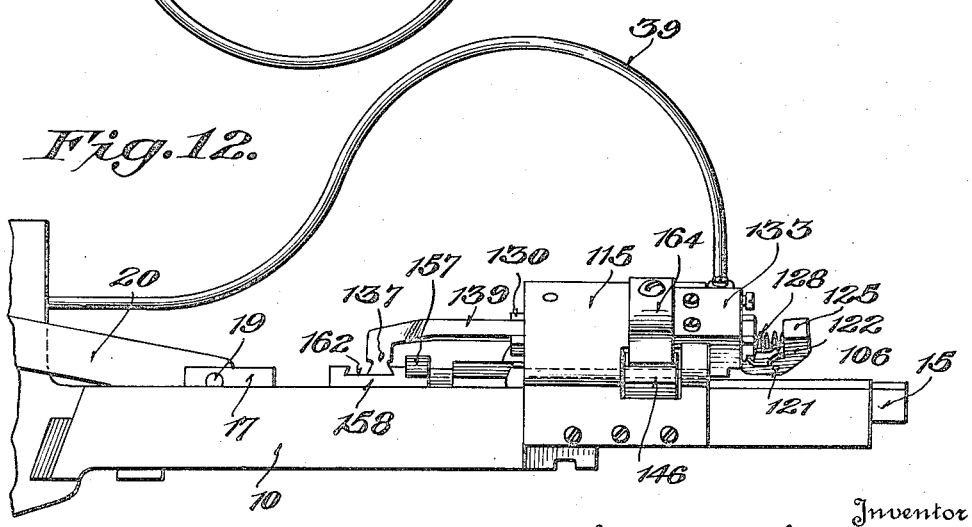
Fig. 12 is an elevational view of the opposite side of the embodiment of Fig. 10.

In the embodiment of the invention shown in Figs. 1 to 9 the wire is fed to the staple-forming device at an angle of approximately 45°. and then the severed section moved to a different plane where the staple is formed, and thereafter fed forwardly in the closely adjacent parallel plane. This arrangement is not essential, as the staple may be formed in the upper or angular plane, and then be moved into the plane in which it is to be fed. Such an embodiment of the present invention is illustrated in Figs. 10 to 17 inclusive.

In the embodiment of Figs. 10 to 17 inclusive, the staple is formed in a plane at an angle to that in which the formed staple is to be fed forwardly to be inserted, preferably in the same plane as that in which the wire is fed to the staple-forming devices, and then the staple is moved from the plane in which it is formed into the plane in which it is to be fed forwardly. The driving mechanism and the wire feeding mechanism (not shown) may be the same as embodied in the structures shown in Figs. 1 to 9 inclusive, although it is to be expressly understood that any other suitable form of driving mechanism and any other suitable form of wire feeding mechanism may be employed if desired.

The wire to form the staple is fed through a tubular guide 39 in a plane shown as substantially at 45° to the plane of the frame 10 of the machine. As in the embodiment previously described the reciprocating member is composed of two parts, a main reciprocating member 13 provided with a nose 15 which is designed to be pressed resiliently against the material into which the staple is to be inserted, and a driving member 14 which forms and feeds successive staples forwardly in a step by step motion, as heretofore described, the means for progressively feeding successive staples forwardly in a step by step motion preferably being of substantially the same construction as heretofore described in conjunction with the embodiment of Figs. 1 to 9 inclusive.

The eccentric rod 20 is pivotally connected at 19 to a projection 18 on the driving member 14, and said member 14 carries a depending block 30 which works in a slot 25 in the frame 10 and cooperates with a spring-pressed plunger 28 in a block 24 on the main driving member 13, as heretofore explained.

Mounted on the frame 10 in any suitable way is a housing 115 for the wire-cutting and staple-forming devices, said housing being of inverted channel-shape and extending at an angle of approximately 45° to the plane of the frame 10, as shown in Fig. 16, so that it makes substantially the same angle to said frame as the guide tube 39. The upper lateral face of said housing 115 is provided with a longitudinally extending slot 116 within which slides a reciprocating cutter bar 117, said cutter bar carrying a tubular bracket 118 which receives the end of the tubular guide 39. The wire passes through the tubular guide and tubular bracket and through an aperture in the reciprocating cutter bar, and the side of the housing is provided with or constitutes a stationary cutter bar having a stationary cutting edge which effects the severing of the wire when said cutter bar is reciprocated in a manner to be explained. Any suitable means may be employed, if desired, to adjust the length of the severed section of wire.

The forward end of said housing 115 is provided at its underside with a forwardly extending projection 120, and pivotally mounted at 121 on the forward end of said projection and at opposite sides of said projection are a pair of levers 122 provided with notches 123 in their rearwardly extending upper edges. At their forward ends (Fig. 13) said levers are connected at 124 so that they move as a unit. Said levers 122 and their connecting wall 124 may be stamped out of sheet metal and the levers bent at right angles to the connecting wall 124. Lips 125 and 126 may also be formed on said connecting wall 124, both above and below the same, and said lips may be bent at right angles to the connecting wall so as to form a socket 127, between said levers and said lips, for a spring 128.

The underside of the top face of said housing 115 is provided with a longitudinally extending channel 129 within which reciprocates a slotted bar 130. The spring 128 is interposed between the forward end of said bar and the connected ends of said levers 122, whereby said bar is normally urged toward the rear and said levers are normally urged to depress their forward ends and elevate their rear ends. The rear ends 131 of said levers 122 are normally held in a depressed position by a V-shaped depending rib 132' on said reciprocating bar 130, but when said bar moves forward relatively to said levers against the tension of said spring 128, said V-shaped projection moves into said notches 123 and allows said spring 128 to press the rearward extremities 131 of said levers upwardly. When said levers are so pressed upwardly they function to move the severed length of wire into the plane of the dies, as to be later explained.

The forward end of the slotted bar 130 is thickened so as to provide a portion 132 which projects below the plane of said bar and carries said rib 132'. This portion 132 constitutes the male die member. The matrix die member is formed as a channel in the forward end of the housing 115 and may be formed in an integral part of said housing. In the form shown, however, a separate matrix block 133 is suitably secured to the forward end of the housing and is provided with a slot 134 (Fig. 16) into and out of which the male die member 132 may move. The lower inner edges of the side walls of the matrix die member are provided with grooves 135 as shown in Fig. 16.

Mounted between the inner or upper face of said slotted bar 130 and the inner face of the main wall of the housing 115 is a second reciprocating member 136 which projects rearwardly beyond said slotted bar, where it is provided with a downwardly depending post 137 for a purpose to be explained. The forward end of said reciprocating bar 136 is bent inwardly at 138 and provided with a pair of downwardly and laterally projecting lugs 139 to constitute a feeding element. To the rear of said feeding element 139 is a depending cam projection 140 having an inclined rear surface and shaped as illustrated in Figs. 13 and 15, said feeding element 139 and cam projection 140 working in the slot 141 of said slotted bar 130. The rear face of the male die member 132 at the end of the slot 141 is provided with a recess 142 into which the feeding elements 138, 139 may move at the time when reciprocating member 136 has moved to the end of the slot 141 and the members 130 and 136 are to move forwardly as a unit against the tension of the spring 128 to permit the levers 122 to move the severed section of wire up into the path of the rear face 143 of the male die member 132.

Pivotally mounted at 145 in the rear wall of the housing is a channel-shaped carriage 146 which may swing to engage its upper face flatwise against the slotted bar 130 and the inner face of the main wall of the housing, which as shown in Fig. 16 is flush with the face of said bar, or may swing downwardly to engage its lower face flatwise against the reciprocating member 14. The inner face of each of the two lateral arms 147 of said carriage has a groove in its inner face as shown at 148, and the rear wall of the carriage is beveled at both its upper and under sides as shown at 149. The lateral arm 147 adjacent the pivot of said carriage is also provided with a downwardly projecting beveled lug 150, and the rear wall of the carriage is provided with a rearwardly projecting stop lug 151.

Pivotally mounted on the upper lateral wall of the housing at 152 (Fig. 15) is a lever 153 which is pivotally connected to the slotted bar 310 at 154. One end 155 of said lever engages in a slot 156 in the movable cutter bar 117 and the opposite end of said lever is designed to cooperate with a lug 157 projecting upwardly from or formed on a block 158 secured to the driving member 14. At its forward end said block is beveled at 159 to cooperate with the depending lug 140 on the channel-shaped carriage, and at its rear end said block is provided in any suitable way with a pair of lugs 160 and 161, shown as constituted by a transverse channel 162 in the block 158, which are designed to cooperate with the depending post 137 on the reciprocating member 136.

The carriage is preferably provided adjacent its pivot 145 with a pair of flattened surfaces 163, and the main wall of the housing 115 carries a flat spring 164 adapted to coact with said surfaces and assure that said carriage moves completely into its limit positions.

In operation, and assuming that the wire is being fed forwardly through the aperture in the movable cutter bar, as driving member 14 moves toward the left, as viewed in Fig. 13, said driving member 14 carries therewith reciprocating member 13 until the nose 15 engages the material into which the staple is to be inserted. Forward movement of said member 13 being stopped, driving member 14 is moved further to the left against the tension of the spring 29, and lug 161 engages the depending post 137 on reciprocating member 136 and causes it to move toward the left, carrying the feeding elements 138, 139 and the cam lug 140 along the slot 141 until the feeding elements move into the recess 142, in which position they are ahead of and above the entering wire. Lug 157 then engages lever 153 and causes said lever to move around its pivot 152. The reciprocating cutter bar 117 is thereby moved toward the right as viewed in Fig. 15 and a length of wire is severed. At the same time slotted bar 130 and reciprocating member 136 are moved as a unit, toward the left as viewed in Fig. 13 and against the tension of the spring 128. When the depending V-shaped ridge 132' comes opposite the notches 123 in the upper sides of the levers 122, said levers move in an anti-clockwise direction around their pivots 121 under the tension of the spring 128, and the rear ends 131 of said levers transfer the severed length of wire into the path of the rear face 143 of the male die member 132 (Fig. 17) and rearward of the feeding lugs 139 which are ahead of the severed section of wire and in the recess 142.

During the forward movement of the member 14 cam surface 159 engages the inclined surface on lug 150 on carriage 146 and wipes said carriage upwardly around its pivot 145 into its upper position, with its grooves 148 in register with the grooves 135 in the matrix die member 133. As the driving shaft continues its rotation, driving member 14 now moves toward the right as viewed in Fig. 13, and spring 128 moves the slotted bar 130 and member 136 toward the right. The male die member 132 therefore forces the severed section of wire into the matrix die member 133 and the staple is formed in the grooves 135 by the relative movement of said die members. The reciprocating cutter bar 117 also returns to initial position and the rib 132' cams the levers 122 to the position shown in Fig. 13. As the driving member 14 moves to the right as viewed in Fig. 13, lug 160 engages the post 137 on member 136 and moves said member toward the right in the slot 141 of bar 130. The feeding elements 139 now move out of the recess 142 and engage the formed staple, moving the same into the grooves 148 of the carriage 146, said carriage then being in its upper position with said grooves 148 registered with the grooves 135. When the feeding elements 139 have moved the staple entirely into the carriage 146 the cam lug 140 engages the upper inclined rear surface 149 on the carriage 146 and wipes the carriage down into a lower position, carrying the staple therewith. In this lower position the staple is in the path of a pair of upstanding pins or lugs 105 on the driving member 14, and on the next movement of the driving member 14 toward the left, in Fig. 13, the formed staple is fed forwardly out of the channel-shaped carriage and into the grooves 97 which are now registered with said grooves 148 in the carriage. The cam surface 159 on said member 14 then engages the inclined surface on the depending lug 150 of the carriage 146 and wipes the carriage up into its upper or inclined position where it is ready to receive the next staple to be formed. The formed staple is moved by the lugs 105 in the grooves 97 into cooperation with depending springs 107 on the cover plate 106 carried by the forward end of the frame in the manner heretofore described in conjunction with the embodiment of Figs. 1 to 9 inclusive, and the successive staples are fed forward in a step by step motion, in one or more steps, to the position where the foremost staple is depressed into the path of the driving member 14 and inserted into the material opposite the nose 15.

It is to be noted that this embodiment of the invention also possesses the advantages of simplicity, compactness, high speed, etc., pointed out in connection with the embodiments of Figs. 1 to 9 inclusive.

In the embodiments of the invention so far described the staple is formed in one plane on a short back stroke and fed forwardly in a different plane on a short forward stroke. While preferred, this is not essential, and in the embodiment of Figs. 18 to 21 inclusive, a construction is shown wherein the staple is formed on a short back stroke in one plane and fed forwardly on a short forward stroke in the same plane. The construction about to be described is also applicable to arrangements or constructions analogous to the embodiment shown in Figs. 1 to 9 inclusive wherein it is desired to have the male die member move out of and into the plane of the reciprocating member by which it is carried.

In the embodiment of Figs. 18 to 21 inclusive, only the staple forming members have been shown in detail, and it is to be understood that the parts to be described may be associated with any suitable compound reciprocating member operated in any suitable way and in conjunction with any suitable wire feeding devices for feeding the wire to the staple-forming members and cutting off suitable lengths of the wire, and also with any suitable means for feeding the formed staples from the staple-forming devices to the point at which they are to be inserted into the material to be operated on—such for example as disclosed in conjunction with the embodiments heretofore described.

As in the embodiments previously described, the frame 10 is a longitudinal channel-shaped member, shown as provided with a cover 10' throughout its length. Slidably mounted in the channel provided by the frame 10 is a compound reciprocating member composed of a main reciprocating member 13 having a nose 15 provided with a slot 16 through which the staple is inserted into the material to be acted upon, and a driving member 14 which is here shown as a relatively thin blade movable with and relatively to the main reciprocating member 13 by reason of any suitable connections between the two.

The wire of which the staple is to be formed passes through an aperture 170 in one of the lateral walls of the frame 10 and along a groove 171 formed in the upper surface of the main reciprocating member 13. The relative movement of the main reciprocating member with respect to the stationary edge at the inner end of the aperture 170 may constitute the cutting mechanism for severing the wire.

The main reciprocating member is cut away at 172, and pivotally mounted within the recess or cut-away portion 172 at 173 is a male die member 174 having on its upper face a groove 175 which registers with the groove 171 when the wire is fed through the aperture 170. The matrix die member is an inverted channel-shaped block 176 suitably secured to the cover 10' as by screws 177. The channel 178 in said matrix die member is sufficiently deep to receive a rearwardly projecting extension 179 on a cover plate 180 carried by the forward end of the main reciprocating member 13. The two lateral walls 181 of the matrix die member 176 project downwardly, as viewed in the figures, on either side of the extension 179 and ride on the face of the main reciprocating member 13.

The wire having been inserted into the groove 171, 175, the staple is formed by moving the male die member 174 so that the severed section of wire is lifted into the plane of the depending lateral walls 181 of the matrix die member, and by moving the main reciprocating member 13 with male die member 174 into the matrix die member 177, or toward the right as viewed in Fig. 19. The width of the male die member 174 is slightly less than the width of the channel 178, as shown in Fig. 20, so as to leave a suitable clearance for the wire between the side walls of the channel 178 and the lateral walls of the elevated die member 174, and the staple is formed with its legs projecting forwardly by the relative movement of the male die member 174 into the matrix die member 176. The male die member is then depressed with its upper surface flush with the surface of the main reciprocating member 13, which leaves the formed staple lying on the surface of the male die member, and the driving member 14 is then moved to the left, as viewed in Fig. 19, to force the staple toward the left in the same plane in which it is formed.

In order to raise and depress the male die member 174 in the manner just described, the following novel mechanism is employed.

The main reciprocating member 13 is also cut away below and rearwardly of the recess 172, as shown at 183, and mounted within said recess 183 is a compound or delay-action block 184, shown more particularly in Fig. 21. This block is somewhat shorter than the length of the recess 183 so that it may have longitudinal movement within said recess and with respect to said main reciprocating member. Said block 184 extends substantially the full width of the channel formed by the frame but is slightly narrower than said channel as illustrated. One side of said block 184 is recessed at 185 and mounted within said recess is an auxiliary block 186. Block 186 is suitably secured to the block 184, as by bolts 187 passing freely through apertures in block 186 and threaded into the block 184, and interposed between the blocks 184 and 186 are one or more springs 188, shown as a plurality of coil springs mounted within recesses in said blocks, whereby the blocks 184 and 186 are pressed frictionally against the sides of the channel in the frame 10.

The forward end of block 184 carries an extension 189 which underlies the rearward end of the male die member 174, and said extension is provided with a groove 190 having an undercut forward edge 191 and a rear cam edge 192. The rearward end of the male die member is provided with a depending lug 193 which has a forward undercut surface for coaction with the surface 191. A light leaf spring 194 is suitably secured to the under surface of the extension 179, the latter being recessed at 195 so that said spring may rise and enter said recess when the staple is lying on the surface of the male die members 174. Said spring 194 tends to depress said male die member into the position shown in Fig. 19.

Assuming that a wire has entered the groove 171, 175, as shown in Fig. 19, and been suitably severed, when the main reciprocating member moves rearwardly, or toward the right as viewed in Fig. 19, the compound block 184, 186, owing to the friction between said block and the sides of the frame, remains stationary until the forward end of said block is engaged by the forward end of the recess 183, whereupon said block is picked up by the main reciprocating member and moved relatively therewith. This relative movement between the groove 190 and the depending post 193 on the male die member 174 causes the cam surface 192 to cam said die member upwardly so that the wire is elevated into the path of the matrix die member, whereupon the staple is formed by the further rearward movement of the main die member.

When the main reciprocating member 13 moves on its forward stroke, toward the left, as viewed in Fig. 19, the compound block 184, 186 at first remains stationary owing to its friction with the channel walls until its rear end is engaged by the rear face of the recess 183. During the relative movement thus effected between the compound blocks 184, 186 and the male die member 174 the forward end of the slot 190 by its engagement and coaction of its undercut surface 191 with the corresponding surface on the lug 193 causes the male die member 174 to be retracted into the recess 172, and during the subsequent relative movement between the driving member 14 and the main reciprocating member 13 the staple is fed forwardly, with its legs advanced as described in conjunction with the embodiments of Fig. 1 to 17 inclusive, being as in the previously embodiments positively controlled by the spring 194 and the subsequent feeding mechanism.

It will therefore be perceived that in this embodiment of the invention the staple is formed and fed forwardly in the same plane, although if desired the delay-action block, with its manner of operation heretofore described, may be used in conjunction with devices wherein the staple is fed forwardly in a different plane from that in which it is formed.

It will therefore be perceived that a simple, strong, high speed stapling mechanism has been provided which may be made in any suitable size to handle wire of any suitable size, form and material for making staples for use in any of the various services to which staples are put, so that the stapling mechanism of this invention is of universal application. All of the movements of the stapling mechanism of this invention are relatively short, brief movements, the staple being formed on a short stroke and being fed on a short stroke, so that the machine may run at a very high speed, whereby it is not only capable of a high output, but is capable of use in conjunction and synchronism with high speed machines for operating upon the material to be stapled, as in the closing of flexible containers, assembling of printed sheets, manufacture of containers of flexible material, etc. Additionally, in view of its high speed of operation, it is capable of making and inserting staples during brief periods in the operation of other machines when in the course of their cycles the material to be stapled is in a proper condition or location.

It will also be perceived that the stapling mechanism is so arranged and constructed that it is very compact and a gang of feeding mechanisms may be arranged closely together, even in side contact, so that a plurality of staples may be simultaneously inserted at less than an inch apart. Moreover, owing to the simplicity and compactness of the stapling mechanism it is readily transportable, easily operable by unskilled labor, and can be readily assembled with other machines. It is also relatively rugged owing to the fact that it is composed of a relatively few number of relatively simple parts having relatively simple movements, and it is also highly efficient and relatively inexpensive. Additionally, the stapling mechanism is positive throughout and the staples are positively acted upon and controlled throughout the period of their formation and their feed.

Simple and effective wire feeding mechanism has also been provided which may be readily adjusted, and mechanism has also been provided whereby the staples may be advanced by relatively short strokes in a step by step motion through any desired distance between the location of the forming dies and the point of insertion, while the character of this feeding mechanism enables it to operate at the same high speed as the staple-forming devices.

Furthermore, as the staple-inserting mechanism is relatively thin at right angles to the plane of the staple, particularly below the staple, the mechanism may be engaged with a flexible container relatively close to the contents of the container and thereby the material of the latter conserved, since the stapling is effected closely to the contents of the container.

While the embodiments of the invention illustrated on the drawings have been described with considerable particularity, it is to be expressly understood that the invention is not to be restricted to these embodiments, as various other mechanical expressions of the invention will now be readily suggested to those skilled in the art. Changes may also be made in the details of construction, arrangement and proportion of parts, and certain features may be used without other features, while features shown only in conjunction with one embodiment may be used with features included in other embodiments.

Other forms of wire feeding and staple-feeding devices may also be used in conjunction with the staple-forming devices included in the present invention. While in the embodiments illustrated the male die member has moved with respect to the matrix die member to form the staple on a back stroke, it is also within the contemplation of this invention, within its broader aspects, to form a staple by a forward stroke of the matrix die member with respect to the male die member. Reference is therefore to be had to the appended claims for a definition of the limits of this invention.

What is claimed is:—

1. In a stapling mechanism, the combination of means movable in one direction for forming the staple in one plane, means for positively moving said staple into a different plane parallel to said first plane, and means for feeding the staple to its position for insertion in said second plane during the opposite movement of said first-named means.

2. In a stapling mechanism, the combination of means movable in one direction for forming a staple in one plane with its legs advanced, means for positively moving said staple into a different plane, and means for feeding said staple in said second plane with its legs advanced to its position for insertion during the opposite movement of said first-named means.

3. In a stapling mechanism, the combination of relatively movable die members cooperating to form the staple with its legs advanced during the stroke of the movable die member, means whereby said staple is positively moved during said stroke into a different plane, and means for feeding said staple forwardly in said second plane during the forward stroke of said movable member.

4. In a stapling mechanism, the combination of relatively movable die members cooperating to form a staple by the short stroke of a relatively movable die member, means whereby said staple is positively moved into a different plane, and means for feeding said staple in said second plane by the opposite short stroke of said movable member.

5. In a stapling mechanism, the combination of relatively movable die members, means for moving said die members relatively, said die members cooperating to move the staple positively into a different plane from that in which the staple is formed, and means for feeding the staple forwardly in said second plane during the reverse relative movement of said die members.

6. In a stapling mechanism, the combination of relatively movable die members, means for moving said die members relatively, said die members cooperating to move the staple positively into a plane substantially parallel to that in which the staple is formed, and means for feeding the staple forwardly in said second plane during the reverse relative movement of said die members.

7. In a stapling mechanism, the combination of a relatively stationary matrix die, a male die, means for moving said male die relatively to said matrix die, means whereby said die members cooperate to move the staple positively into a different plane from that in which the staple is formed during the movement of the male die in one direction, and means for feeding the staple forwardly in said second plane during the movement of the male die in the opposite direction.

8. In a stapling mechanism, the combination of a relatively stationary matrix die, a relatively movable male die cooperating with said matrix die to form the staple on the back stroke of said male die, means whereby the formed staple is positively moved into a second plane during the back stroke of said male die, and means whereby said staple is fed forwardly during the forward stroke of said male die.

9. In a stapling mechanism, the combination of relatively movable die members including a matrix die and a male die, said matrix die being provided with an inclined surface and said male die being mounted to move toward and away from said matrix die, and means cooperating with said male die whereby it cooperates with said matrix die to form the staple and also move it down said inclined surface and into a second plane positively.

10. In a stapling mechanism, the combination of a relatively stationary matrix die, a relatively movable male die, means to reciprocate said male die relatively to said matrix die, and means to move said male die member transversely of its stroke into and out of cooperation with said matrix die, said male die cooperating with said staple whereby the same is positively controlled throughout its movement.

11. In a stapling mechanism, the combination of a relatively stationary matrix die, a relatively movable male die, said matrix die having an inclined surface leading to grooves, and means cooperating with said male die for moving the same both longitudinally and toward and away from said matrix die member whereby said male die member by its compound movement forms the staple and positively moves the same down said inclined surface and into said grooves.

12. In a stapling mechanism, the combination of a relatively stationary matrix die, a relatively movable male die, means for reciprocating said male die, means mounting said male die whereby said male die may move transversely of its stroke toward and away from said matrix die, and means on said matrix die cooperating with said male die whereby said staple is positively moved into a different plane after it is formed by the relative movement of said dies.

13. In a stapling mechanism, the combination of a relatively stationary matrix die, a relatively movable male die cooperating with said matrix die to form a staple with its legs advanced, means whereby the formed staple is positively moved into a second plane with its legs advanced during the forming stroke of said male die, and means whereby said staple is fed forwardly in said second plane during the reverse stroke of said male die.

14. In a stapling mechanism, the combination of a relatively long narrow frame, wire feeding, staple forming and staple feeding devices mounted on said frame between the planes defined by the lateral walls of said frame, a driving shaft at right angles to the length of said frame, and means on said shaft between said planes for driving said wire feeding, staple forming and staple feeding devices.

15. In a stapling mechanism, the combination of a relatively long narrow frame providing a way, relatively movable members carried by said frame for forming and feeding staples lengthwise thereof, said frame having a width approximately equal to the length of the wire from which the staple is formed, a wire feeding device mounted on said frame between the planes defined by the lateral walls thereof, a driving shaft extending at right angles to the length of said frame, and means on said shaft between said planes for driving said staple forming and feeding devices and said wire feeding device.

16. In a stapling mechanism, the combination of a relatively long narrow channel-shaped frame, a male die member reciprocatingly mounted in said frame, a matrix die member on said frame, said die members cooperating to form a staple, means whereby the relative reciprocation of said die members also feeds said staple forwardly, wire feeding and wire cutting devices, and means for reciprocating said male die member and operating said wire feeding and wire cutting devices confined between the planes of the lateral walls of said frame.

17. In a stapling mechanism, the combination of a relatively long narrow frame, a wire feeding device mounted on said frame, staple forming dies carried by said frame, said wire feeding devices delivering the wire to said dies at an angle to the plane of said frame, means for cutting off lengths of wire to be formed into staples, and means for moving the formed staple lengthwise of and in the plane of said frame.

18. In a stapling mechanism, the combination of relatively movable die members, a longitudinally extending frame having a width substantially the same as that of the matrix die member, means for feeding wire to said die members mounted on said frame between the planes of the lateral walls thereof, means for producing relative movement between said die members, and driving means for said wire feeding device and said die moving members disposed between said planes whereby a plurality of said frames may be arranged in lateral contact.

19. In a stapling mechanism, the combination of a longitudinally extending frame carrying relatively movable die members, said frame being of substantially the same width as the matrix die member, a wire feeding device mounted on said frame and disposed between the planes of the lateral walls thereof, said wire feeding device delivering wire to said dies at an angle to the plane of said frame, means for cutting off lengths of wire, staple feeding means movable lengthwise of and in the plane of said frame, and means whereby the formed staple is moved into the plane of said feeding means.

20. In a stapling mechanism, the combination of a relatively long narrow frame, a wire feeding device mounted on said frame, staple-forming dies carried by said frame, means for cutting off lengths of wire to be formed into staples actuated by the relative movement of said dies, and means for moving the formed staple forwardly in the plane of said frame actuated by the relative movement of said dies.

21. In a stapling mechanism, the combination of a longitudinally extending frame carrying relatively movable die members, a wire feeding device mounted on said frame and disposed between the planes of the lateral walls thereof, means for cutting off lengths of wire, staple feeding means movable lengthwise of and in the plane of said frame, means whereby the formed staple is moved into the plane of said feeding means, and driving means for said die members, wire feeding devices, wire cutting means and staple feeding means embraced between the planes of the lateral walls of said frame.

22. In a stapling mechanism, in combination with relatively movable die members, means for feeding wire to said die members including a movable carriage, wire clamping means carried by said carriage, and means for releasing said clamping means from the wire during a portion of the feeding movement of said carriage.

23. In a stapling mechanism, in combination with relatively movable die members, means for feeding wire to said die members including a movable carriage, wire clamping means carried by said carriage, means for releasing said clamping means from the wire during a portion of the feeding movement of said carriage, and means for adjusting the proportion of the movement of said carriage during which said clamping means is released from the wire.

24. In a stapling mechanism, in combination with relatively movable die members, means for feeding wire to said die members including a movable carriage, wire clamping means carried by said carriage, means for releasing said clamping means from the wire during a portion of the feeding movement of said carriage, means for adjusting the proportion of the movement of said carriage during which said clamping means is released from the wire, means for cutting off lengths of said wire disposed adjacent said die members, and means for adjusting said last-named means simultaneously with the adjusting of the wire feeding means whereby the severed section of wire is centered with respect to said die members.

25. In a stapling mechanism, in combination with relatively movable die members, means for feeding wire to said die members including a movable carriage, wire clamping means carried by said carriage, a member movable with and relatively to said carriage, said member cooperating with said clamping means whereby said clamping means is released by the relative movement of said carriage and member, and means to stop said member whereby said carriage may move relatively thereto.

26. In a stapling mechanism, in combination with relatively movable die members, means for feeding wire to said die members including a movable carriage, wire clamping means carried by said carriage, a member movable with and relatively to said carriage, said member cooperating with said clamping means whereby said clamping means is released by the relative movement of said carriage and member, means to stop said member whereby said carriage may move relatively thereto, and means for adjusting said stopping means.

27. In a stapling mechanism, in combination with relatively movable die members, means for feeding wire to said die members including a movable carriage, wire clamping means carried by said carriage, a member movable with and relatively to said carriage, said member cooperating with said clamping means whereby said clamping means is released by the relative movement of said carriage and member, means to stop said member whereby said carriage may move relatively thereto, means for adjusting said stopping means, means for cutting off lengths of wire adjacent said die members, and means for adjusting said cutting mechanism operated by the adjustment of said stopping means whereby the severed section of wire is centered with respect to said dies.

28. In a stapling mechanism, in combination with relatively movable die members, means for feeding wire to said die members including a movable carriage, wire clamping means carried by said carriage, a member movable with said carriage but movable relatively thereto, means for stopping said member before said carriage reaches either end of its stroke, and means on said member cooperating with the clamping means whereby their relative movement effects the movement of said clamping means into and out of clamping engagement with the wire adjacent the opposite end of the stroke of said carriage.

29. In a stapling mechanism, in combination with relatively movable die members, means for feeding wire to said die members including a movable carriage, wire clamping means carried by said carriage, a member carried by said carriage and movable relatively thereto, means for stopping said member before said carriage reaches either extremity of its stroke whereby said carriage moves relatively to said member, and means whereby the relative movement of said carriage and member alternately effects the movement of the clamping means into and out of clamping engagement with the wire.

30. In a stapling mechanism, the combination of relatively movable die members for forming the staples, and means for feeding the formed staples to their position of insertion in a step-by-step motion through a greater distance than the stroke of said relatively movable die members.

31. In a stapling mechanism, the combination of relatively movable die members for forming the staples, means for feeding staples from said die members to their position of insertion in a step-by-step motion, and means cooperating with said staples as they are fed forwardly to positively control and prevent dislocation of said staples at all stages of their advancement.

32. In a stapling mechanism, the combination of relatively movable die members for forming the staples, and means movable with the relatively movable die member and provided with a plurality of elements spaced in the direction the staple is to be fed for engaging and advancing through successive feeding stages the successive staples as they are delivered from said die members.

33. In a stapling mechanism, in combination with relatively movable die members for forming staples, means movable with the relatively movable die member and provided with a plurality of elements for engaging and feeding successive staples as they are delivered from the die members, and a plurality of members for engaging said staples as they are advanced to prevent the dislocation of said staples.

34. In a stapling mechanism, in combination with relatively movable die members for forming staples, a member movable with the relatively movable die member and provided with a plurality of elements whereby the successive staples are fed forward in a step-by-step motion, grooved means for guiding the advancing staples, and resilient means for preventing the dislocation of said staples from said grooves.

35. In a stapling mechanism, in combination with relatively movable die members, a member movable with the relatively movable die member and provided with a plurality of feeding elements, a member guiding said feeding member and provided with grooves for guiding the staples, and means for preventing retraction of said staples and positively holding the staples in said groove during their advancement.

36. In a stapling mechanism, in combination with relatively movable die members for forming the staples, a member movable with the relatively movable die member and provided with a plurality of feeding elements, and a corresponding number of resilient members for preventing the retraction of said staples and cooperating with the staples to positively control the same as they are advanced.

37. In a stapling mechanism, in combination with relatively movable die members for forming the staples, a member movable with the relatively movable die member and provided with a plurality of feeding elements, means guiding said feeding member and provided with grooves for guiding the staples, and a plurality of members provided with stops for preventing the retraction of the successive staples and with resilient arms for holding said staples in said grooves during their advancement.

38. In a stapling mechanism, a frame provided with grooves, a matrix die carried by said frame and provided with an inclined surface, and a male die cooperating with said matrix die for forming the staples and moving the formed staple down said inclined surface and into said grooves positively.

39. In a stapling mechanism, a frame provided with grooves, a matrix die carried by said frame and provided with an inclined surface, and a male die cooperating with said matrix die for forming the staple and moving the formed staple down said inclined surface and into said grooves positively, said grooves at the base of said inclined surface forming a channel slightly wider than the width at the inclined surface whereby the legs of said staples spring resiliently into said grooves.

40. In a stapling mechanism, in combination with a frame, a member rectilinearly movable in said frame member, said frame member being grooved at either side of said rectilinearly movable member, a matrix die mounted on said frame and provided with an inclined surface, and means on said rectilinearly movable member for cooperating with said matrix member to form the staple and move the same down the inclined surface, said means positively moving the formed staple from said inclined surface into said grooves.

41. In a stapling mechanism, in combination with a frame, a rectilinearly movable member slidable in said frame, said frame being provided with grooves on either side of said member, a matrix die mounted on said frame over the path of said member, said die being provided with a rearwardly inclined surface, and means on said member cooperating with said die to form the staple and move the same down said inclined surface into said grooves, said means being retained in positive relation to the staple until after the staple is positively engaged in said grooves.

42. In a stapling mechanism, in combination with a frame, a rectilinearly movable member slidable in said frame, said frame being provided with grooves on either side of said member, a matrix die mounted on said frame over the path of said member, said die being provided with a rearwardly inclined surface, means on said member cooperating with said die to form the staple and move the same down said inclined surface and into said grooves, said means being retained in positive relation to the staple until after the staple is positively engaged in said grooves, and means on said member for positively feeding the staple forwardly in said groves as said member moves in the opposite direction.

43. In a stapling mechanism, in combination with a longitudinally extending frame, a member rectilinearly movable in said frame, a matrix die mounted on said frame over the path of said member, a male die member pivotally mounted on said member and movable into cooperation with said matrix die during the back stroke of said member, and friction means whereby said male die member returns to the plane of said member at the end of its backward stroke.

44. In a stapling mechanism, in combination with a longitudinally extending frame, a member rectilinearly movable in said frame, a matrix die mounted on said frame over the path of said member, a male die pivotally mounted on the first-named member and movable into cooperation with said matrix die during the back stroke of said member, and means between said male die member and said frame whereby said male die member moves into cooperative relation with said matrix die adjacent the beginning of the back stroke of said first-named member and returns to the plane of said member adjacent the opposite extremity of movement of said first-named member.

45. In a stapling mechanism, in combination with a longitudinally extending frame providing a slideway, a member rectilinearly movable in said slideway, a rotatable element rotating in the plane of said member and cooperating therewith to give said member a short forward and backward stroke, a matrix die mounted on said slideway, a male die movable with said member and cooperating with said matrix die to form a staple with its legs advanced on the short back stroke of said member, and means on said member for advancing the staple toward its position of insertion with its legs advanced by the short forward stroke of said member.

46. In a stapling mechanism, in combination with a longitudinally extending frame providing a slideway, a member rectilinearly movable in said slideway, a rotatable element rotating in the plane of said member and cooperating with said member to give the same a short forward and backward stroke, a matrix die member mounted on said slideway, a male die movable with said member and cooperating with said matrix die to form a staple with its legs advanced on the short backward stroke of said member, means for moving said staple into a different plane during the said backward stroke, and means on said member for advancing said staple in said last named plane.

47. In a stapling mechanism, in combination with a longitudinally extending frame, a rectilinearly movable member slidable in said frame, a matrix die mounted on said frame, a male die mounted on said member and cooperating with said die to form a staple, means for feeding the formed staple in a different plane from that in which it is formed, and means for positively moving and controlling said formed staple during its movement into the plane in which it is to be fed.

48. In a stapling mechanism, in combination with a longitudinally extending frame, a male die member reciprocating in said frame, a matrix die cooperating with said male die and provided with an inclined surface, and means whereby the male die positively moves said staple down said inclined surface and into the plane in which it is to be fed to the position of insertion.

49. In a stapling mechanism, in combination with a longitudinally extending frame providing a guideway, a compound reciprocating member mounted in said guideway and including a main reciprocating member provided with a nose through which the staple is to be inserted and a staple-driving member, and means between said members whereby said driving member moves said nose into engagement with the material into which the staple is to be inserted.

50. In a stapling mechanism, in combination with a longitudinally extending frame providing a guideway, a compound reciprocating member mounted in said guideway and including a main reciprocating member provided with a nose through which the staple is to be inserted and a staple driving member, and means between said main reciprocating and staple driving members whereby said members move as a unit until said nose is pressed against the material into which the staple is to be inserted and whereby said staple driving member moves relatively to said main reciprocating member to insert the staple while said nose is pressed resiliently against said material.

51. In a stapling mechanism, in combination with a longitudinally extending frame providing a slideway, a member rectilinearly movable in said slideway, an element rotatable in the plane of said member and cooperating therewith to give said member a short forward and backward stroke, relatively movable die members actuated by the movement of said member and adapted to form staples with their legs advanced during the stroke of said movable member in one direction, and means on said member for advancing the formed staples toward their position of insertion with their legs advanced during the reverse stroke of said movable member.

52. In a stapling mechanism, in combination with a longitudinally extending frame providing a slideway, a member rectilinearly movable in said slideway, an element rotatable in the plane of said member and cooperating therewith to give said member a short forward and backward stroke, relatively movable die members actuated by the movement of said member and adapted to form staples with their legs advanced, means for moving the staple positively into a different plane, and means on said member for advancing said staple in said last-named plane.

53. In a stapling mechanism, in combination with a longitudinally extending frame providing a slideway, a member rectilinearly movable in said slideway, an element rotatable in the plane of said member and cooperating therewith to give said member a short forward and backward stroke, relatively movable die members actuated by the movement of said member and adapted to form staples, means for moving said staple into a different plane during the stroke of the relatively movable member in said direction, and means on said member for advancing the staples in said last-named plane as said member moves in the opposite direction.

54. In stapling mechanism, in combination with relatively movable die members, means for feeding wire to said die members including wire clamping means, means for feeding said clamping means forwardly and rearwardly, means whereby said clamping means are held open during the rearward stroke, and means for holding said clamping means open until said clamping means starts on its forward stroke.

55. In stapling mechanism, in combination with relatively movable die members, means for feeding wire to said die members including a movable carriage, wire clamping means carried by said carriage, a member movable with said carriage for holding said clamping means open during the return stroke of said carriage, and means cooperating with said member to hold said clamping means open until said carriage starts on its forward stroke.

In testimony whereof I have signed this specification.

ISAAC W. LITCHFIELD.